(12) United States Patent
Okui (10) Patent No.: US 6,445,089 B1
(45) Date of Patent: Sep. 3, 2002

(54) UNINTERRUPTIBLE POWER SYSTEM

(75) Inventor: Yoshiaki Okui, Tokyo (JP)

(73) Assignee: Sanyo Denki Co. Ltd., Tokyo (JP)

( * ) Notice: Subject to any disclaimer, the term of this patent is extended or adjusted under 35 U.S.C. 154(b) by 0 days.

(21) Appl. No.: 09/956,185

(22) Filed: Sep. 19, 2001

(30) Foreign Application Priority Data

Sep. 22, 2000 (JP) ........................................ 2000-288480

(51) Int. Cl.$^7$ .............................. H02J 7/00; H02M 5/42
(52) U.S. Cl. ........................................ 307/66; 363/89
(58) Field of Search .......................... 363/84, 89, 125, 363/127; 307/46, 48, 64, 66, 72–75, 85

(56) References Cited

U.S. PATENT DOCUMENTS

| | | | |
|---|---|---|---|
| 5,446,645 A | * | 8/1995 | Shirahama et al. ............ 363/71 |
| 5,483,463 A | * | 1/1996 | Qin et al. ..................... 364/492 |
| 5,747,887 A | * | 5/1998 | Takamaga et al. ............. 307/64 |
| 6,330,174 B1 | * | 12/2001 | Yeah ............................ 363/89 |

FOREIGN PATENT DOCUMENTS

| | | |
|---|---|---|
| JP | 08-051735 | 2/1996 |
| JP | 09-056087 | 2/1997 |
| JP | 10-014251 | 1/1998 |

* cited by examiner

Primary Examiner—Matthew Nguyen
(74) Attorney, Agent, or Firm—Rankin, Hill, Porter & Clark LLP (57) ABSTRACT

An uninterruptible power system capable of reducing strain in an output voltage thereof as compared with the prior art. A DC voltage control circuit of a current control system obtains an input current command value on the basis of a multiplied value between a differential voltage between a DC voltage command and a DC-side voltage of a power converter and an output of a reference voltage forming circuit. A current control circuit outputs, as a current control command, a value obtained by subtracting a value of a load current flowing to a load and a value of a current flowing from an AC side into the power converter from the input current command value. An AC current flowing through an AC switch is used as the input current command value during a period of time for which an abnormal voltage detection circuit detects momentary abnormality.

8 Claims, 7 Drawing Sheets

UNINTERRUPTIBLE POWER SYSTEM

BACKGROUND OF THE INVENTION

This invention relates to an uninterruptible power system, and more particularly to an uninterruptible power system of the normally commercial power feed type adapted to carry out electric supply to a load through an AC switch when a commercial power supply is in a normal or silent condition and turn off the AC switch when power stoppage or a power failure occurs in the commercial power supply, to thereby convert DC power previously stored in a storage battery into AC power by means of a power converter, leading to feeding of the AC power to the load, resulting in ensuring power electric supply without interruption.

A conventional control circuit for an uninterruptible power system is disclosed in Japanese Patent Application Laid-Open Publication No. 51735/1996, Japanese Patent Application Laid-Open Publication No. 56087/1997 and Japanese Patent Application Laid-Open Publication No. 14251/1998. The conventional control circuit disclosed is so constructed that a command having a current control command and a voltage control command added to each other is inputted to a PWM comparator of a power converter with an active filter function to prepare a gate signal for the power converter. The conventional control circuit is adapted to output a current control command to the uninterruptible power system supposing that a commercial power supply is normal or silent unless a power failure detection circuit detects a power failure of the commercial power supply, even when the commercial power supply is actually reduced in voltage below a predetermined level.

Thus, the conventional uninterruptible power system is fed with a current control command supposing that no abnormality occurs unless power failure of the commercial power supply is detected, even when any abnormality in voltage such as a voltage reduction actually occurs in the commercial power supply. This causes strain at a large magnitude to occur in an output voltage thereof fed to a load due to a current which intends to flow from the power converter toward the commercial power supply.

Also, the conventional uninterruptible power system often includes a DC/DC converter arranged between the power converter and a storage battery. The DC/DC converter acts to frequently operate when any abnormality in voltage such as a voltage reduction occurs in the commercial power supply, to thereby feed DC power from the storage battery to the power converter. Unfortunately, this causes the storage battery to be deteriorated in durability or operating life.

SUMMARY OF THE INVENTION

The present invention has been made in view of the foregoing disadvantage of the prior art.

Accordingly, it is an object of the present invention to provide an uninterruptible power system which is capable of significantly reducing strain in an output voltage thereof.

It is another object of the present invention to provide an uninterruptible power system which is capable of enhancing durability of a storage battery or an operating life thereof.

In accordance with the present invention, an uninterruptible power system is provided. The uninterruptible power system includes an abnormal voltage detection circuit for detecting voltage reduction abnormality of a commercial power supply, an AC switch turned on to permit AC power to be fed from the commercial power supply to a load when the commercial power supply is in a normal condition and turned off when the commercial power supply falls into an abnormal condition, a storage battery, and a power converter of the voltage control type arranged between the AC switch and the storage battery. The power converter carries out power rectifying operation of converting AC power of the commercial power supply into DC power to charge the storage battery by the DC power and active filter operation of flowing a current for compensating a harmonic current and/or a reactive current flowing to the load when the commercial power supply is in a normal condition. The power converter carries out power inverting operation of inverting DC power into AC power to feed the AC power to the load mainly using the storage battery as a power supply therefor when the commercial power supply is in a condition other than the silent condition. The uninterruptible power system further includes a control command generation means for outputting a control command for feeding AC power to the load without a power failure to the power converter. The control command generation means includes a voltage control system for outputting a voltage control command which permits the power converter to carry out the power inverting operation and a current control system for outputting a current control command which permits the power converter to carry out the power rectifying operation and active filter operation. The uninterruptible power system further includes a reference voltage generating circuit for generating a reference sinusoidal voltage synchronized with the commercial power supply.

In the present invention generally constructed as described above, the control command generation means is configured so as to output the current control command and voltage control command to the power converter while adding them to each other. The current control system is constructed so as to provide an input current command value on the basis of a multiplied value obtained by multiplication between a differential voltage between a DC command voltage commanded by a DC voltage command and a DC-side voltage of the power converter and an output of the reference voltage generating forming circuit, and to thereby output the current control command on the basis of a value obtained by subtracting a load current value from the input current command value. The current control system is constructed so as to use an AC current flowing through the AC switch or a value corresponding to the AC current as the input current command value when the abnormal voltage detection circuit carries out detection of voltage reduction abnormality in the commercial power supply. The value obtained by subtracting the load current flowing to the load from the input current command value acts as a command value indicating a current flowing through the power converter. A value obtained by subtracting a value of a current flowing to an AC-side of the power converter from the command value acts as a corrected value of a current command of the power converter or a current control command. The term "value corresponding to AC current" as used herein is intended to mean a value proportional to the AC current in predetermined relationship. When voltage reduction abnormality occurs in the commercial power supply, the AC current flowing through the AC switch is gradually decreased toward zero with the voltage reduction. Thus, use of the AC current or the value corresponding to the AC current as the input current command value permits a reduction in current control command with the voltage reduction, to thereby reduce strain in the output voltage as compared with the prior art.

The current control system may be configured so as to output an added value obtained by addition between a value obtained by increasing a difference between an AC current flowing through the AC switch and the multiplied value by constant times and the AC current flowing through the AC switch as the input current command value. This permits the output to further approach a sinusoidal waveform.

When PQ operation is used in the current control system, the current control system may be configured so as to provide a momentary load-side effective power value corresponding to momentary effective power fed to the load on the basis of an output of the reference voltage forming circuit and the load current value and provide a momentary input-side effective power command value which permits an input current to have a sinusoidal waveform by removing an AC component from the momentary load-side effective power command value, to thereby output the current control command on the basis of a value obtained by subtracting the momentary load-side effective power value from the momentary input-side effective power command value. Also, the current control system, when the abnormal voltage detection circuit detects voltage reduction abnormality in the commercial power supply, may be configured so as to use a momentary effective power value obtained from an output of the reference voltage generating circuit and an AC current flowing through the AC switch as the momentary input-side effective power command value. In the PQ operation as well, use of the momentary effective power value obtained from the output of the reference voltage forming circuit and the AC current flowing through the AC switch as the momentary input-side effective power command value likewise leads to a reduction in current control command with the voltage reduction, to thereby reduce strain in the output voltage as compared with the prior art.

The uninterruptible power system of the present invention may further include a power failure detection circuit for detecting a power failure of the commercial power supply and a DC/DC converter arranged between the power converter and the storage battery. The DC/DC converter may be configured so as to feed DC power from the storage battery to the power converter during a period of time for which the power failure detection circuit detects a power failure of the commercial power supply. Such configuration eliminates waste discharge of the storage battery, to thereby enhance durability thereof. The DC/DC converter may include a capacitor connected in parallel to the storage battery. In this instance, the power converter may feed an AC current to the load using the capacitor as a power supply therefor during a period of time extending from detection of a voltage reduction of the commercial power supply by the abnormal voltage detection circuit to detection of a power failure of the commercial power supply by the power failure detection circuit. This permits discharge of the capacitor rather than the storage battery to feed AC power to the load. In general, repeating of charging and discharge of a capacitor does not cause a rapid deterioration in life thereof as compared with a deterioration in life of a storage battery due to frequent discharge thereof. The power failure detection circuit may be constructed in any desired manner. For example, a power failure of the commercial power supply may be judged to occur when a period of time for which an average of an output of the commercial power supply is equal to or lower than a predetermined level is equal to or exceeds a predetermined period of time. In this instance, the predetermined period of time may be set to be shorter than a period of time required for a voltage of the capacitor to be reduced to a predetermined level or below. Alternatively, the power failure detection circuit may be configured so as to detect a power failure of the commercial power supply when a voltage across the capacitor is reduced to a level equal to or below a predetermined voltage level. This permits smooth changing-over from discharge of the capacitor to that of the storage battery without causing over-discharge of the capacitor. Such construction or technical idea may be solely employed.

BRIEF DESCRIPTION OF THE DRAWINGS

These and other objects and many of the attendant advantage of the present invention will be readily appreciated as the same becomes better understood by reference to the following detailed description when considered in connection with the accompanying drawings; wherein.

DETAILED DESCRIPTION OF THE PREFERRED EMBODIMENTS

Now, an uninterruptible power system according to the present invention will be described with reference to the accompanying drawings.

Figure 1:
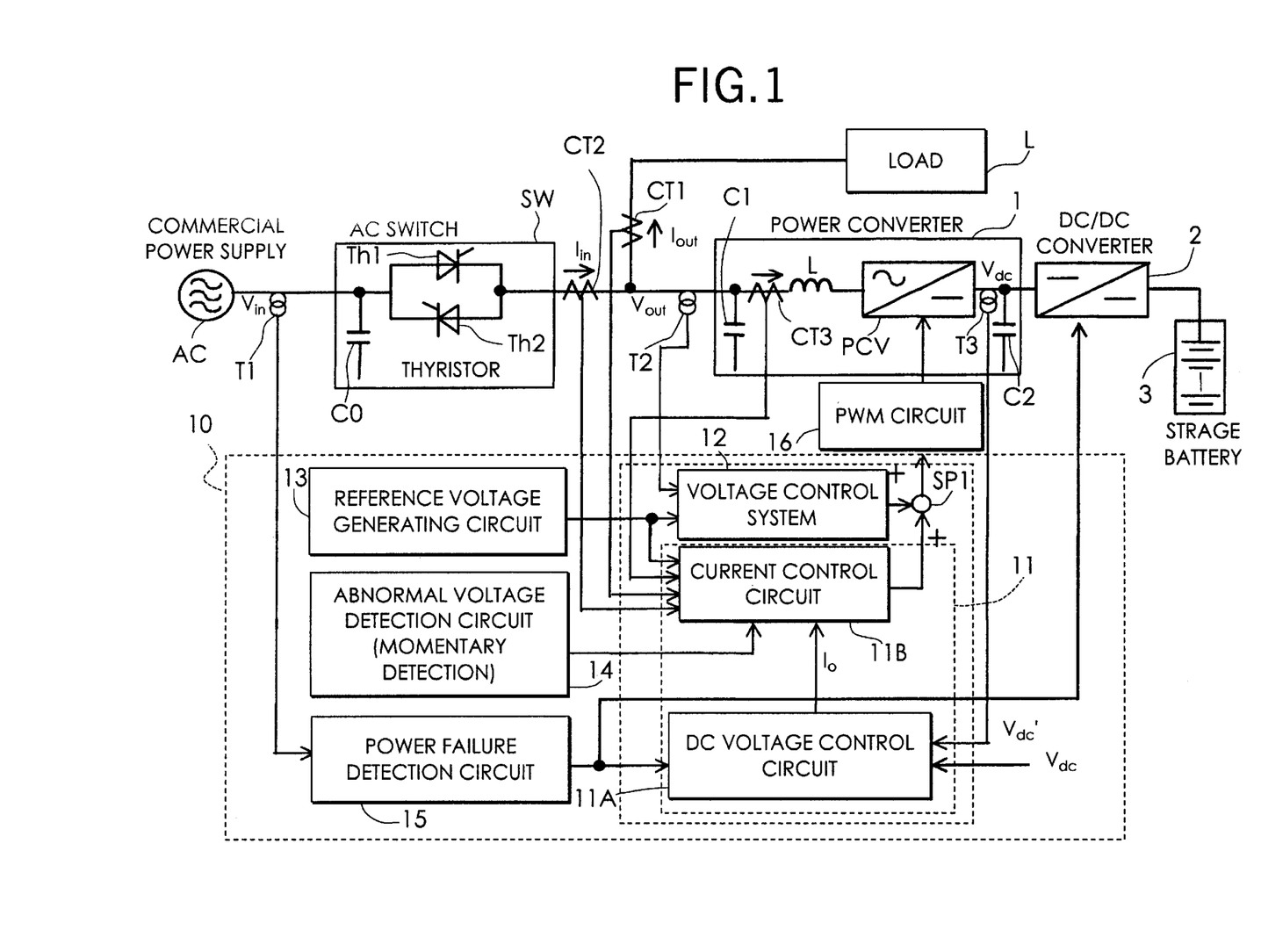
FIG. 1 is a block circuit diagram generally showing an embodiment of an uninterruptible power system according to the present invention.

Referring first to FIG. 1, an embodiment of an uninterruptible power system according to the present invention is illustrated. In the illustrated embodiment, a commercial power supply designated at reference character AC is a three-phase AC power supply. However, in FIG. 1, only a connection line for a single phase or one phase and a control system are merely shown for the sake of brevity. In FIG. 1, an AC switch SW, a power converter 1 of the voltage control type, a DC/DC converter 2 and a storage battery 3 may be essentially constructed in a conventional manner. The AC switch SW arranged between the commercial power supply AC and the power converter 1 corresponds to one phase and includes two thyristors Th1 and Th2 connected in reverse-parallel to each other. A circuit for the AC switch SW has a capacitor CO arranged between an input portion thereof and a neutral point thereof. When the commercial power supply AC is in a normal or silent condition, AC power is fed from the commercial power supply AC through the switch SW to a load L. Thus, when the commercial power supply AC is in a normal condition, the AC switch SW is turned on to permit AC power to be fed from the commercial power supply AC to the load L therethrough. When the commercial power supply AC falls into a full power failure condition, the AC switch SW is turned off to interrupt feeding of AC power from the commercial power supply AC to the load L. In the illustrated embodiment, any specific forced turn-off circuit is not provided for the thyristors Th1 and Th2 of the AC switch SW. In the illustrated embodiment, when any abnormality occurs in the commercial power supply AC, a current fed thereto from the power converter 1 permits turn-off of the thyristors Th1 and Th2 to be attained, as described below.

Also, the power converter 1 of the voltage control type, when the commercial power supply AC is in a normal or silent condition, functions to convert AC power of the commercial power supply AC into DC power, to thereby carry out power rectifying operation of charging the storage battery 3 through the DC/DC converter 2 and active filter operation of flowing a current for compensating a harmonic current and/or a reactive current flowing to the load L. Also, the power converter 1 carries out power inverting operation of converting DC power into AC power to feed the load L with the AC power using the storage battery 3 as a power supply therefor mainly during a period of time for which a power failure detection circuit 15 detects a power failure of the commercial power supply AC. The power converter 1 includes a capacitor C1 arranged between an AC terminal thereof and a neutral point thereof, a reactor L arranged in series between the AC terminal thereof and an AC terminal of a converter for power conversion designated at reference character PCV, and a capacitor C2 arranged between a DC terminal of the power conversion converter PCV and the neutral point. It may be considered that the capacitor C2 is connected in series to the storage battery 3 through the DC/DC converter 2. Configuration of such a power converter of the voltage control type and operation thereof are known in the art, as described in detail in Japanese Patent Application Laid-Open Publication No. 56087/1997 or the like.

The AC switch SW is provided on an AC line thereof positioned on an input side thereof with an instrument transformer T1 for detecting an AC voltage fed thereto from the commercial power supply AC. Also, the power converter 1 is provided on an AC line thereof positioned on a side of the AC terminal thereof with an instrument transformer T2 for detecting an AC voltage across the AC line. Further, the power converter 1 is provided on a DC line thereof on a side of a DC terminal thereof with an instrument transformer T3 for detecting a DC voltage across the DC line. In addition, the AC line for feeding AC power to the load L is provided thereon with a current transformer CT1 for measuring a load current. Furthermore, the AC switch SW is provided on an AC line thereof on a load side thereof with a current transformer CT2 for measuring an AC current. Moreover, a current transformer CT3 is arranged between a connection between the capacitor C1 arranged in the power converter 1 and the reactor L and the reactor L so as to measure an AC current flowing through the power converter 1.

Reference numeral 10 designates a control command generation means 10, which includes a current control system 11, a voltage control system 12, a reference voltage generating circuit 13 for outputting a reference sinusoidal wave in synchronism with an AC voltage outputted from the commercial power supply AC, an abnormal voltage detection circuit 14 for detecting voltage reduction abnormality of the commercial power supply AC, and a power failure detection circuit 15 for detecting a power failure of the commercial power supply AC. The abnormal voltage detection circuit 14 is constructed so as to prepare two kinds of reference AC voltage signals different in offset voltage from each other to form a predetermined band width, resulting in outputting a voltage abnormality detection signal indicating that voltage reduction abnormality occurs in an output voltage of the commercial power supply AC, only during a period of time for which an AC voltage Vin generated from the commercial power supply AC is above or out of the band width between two reference AC voltage signals. The abnormal voltage detection circuit 14 exhibiting such a function may be constructed in any suitable conventional manner. The power failure detection circuit 15 is constructed so as to rectify an output of the commercial power supply AC to obtain an average voltage level, and to judge that power failure occurs in the commercial power supply AC, resulting in outputting a power failure detection signal, when a period of time during which the average voltage level is kept equal to or lower than a predetermined power failure judgement reference voltage level is equal to or longer than a predetermined period of time. In FIG. 1, reference numeral 16 designates a PWM circuit for outputting a PWM control signal for subjecting the power converter 1 of the voltage control type to PWM control.

Figure 2:
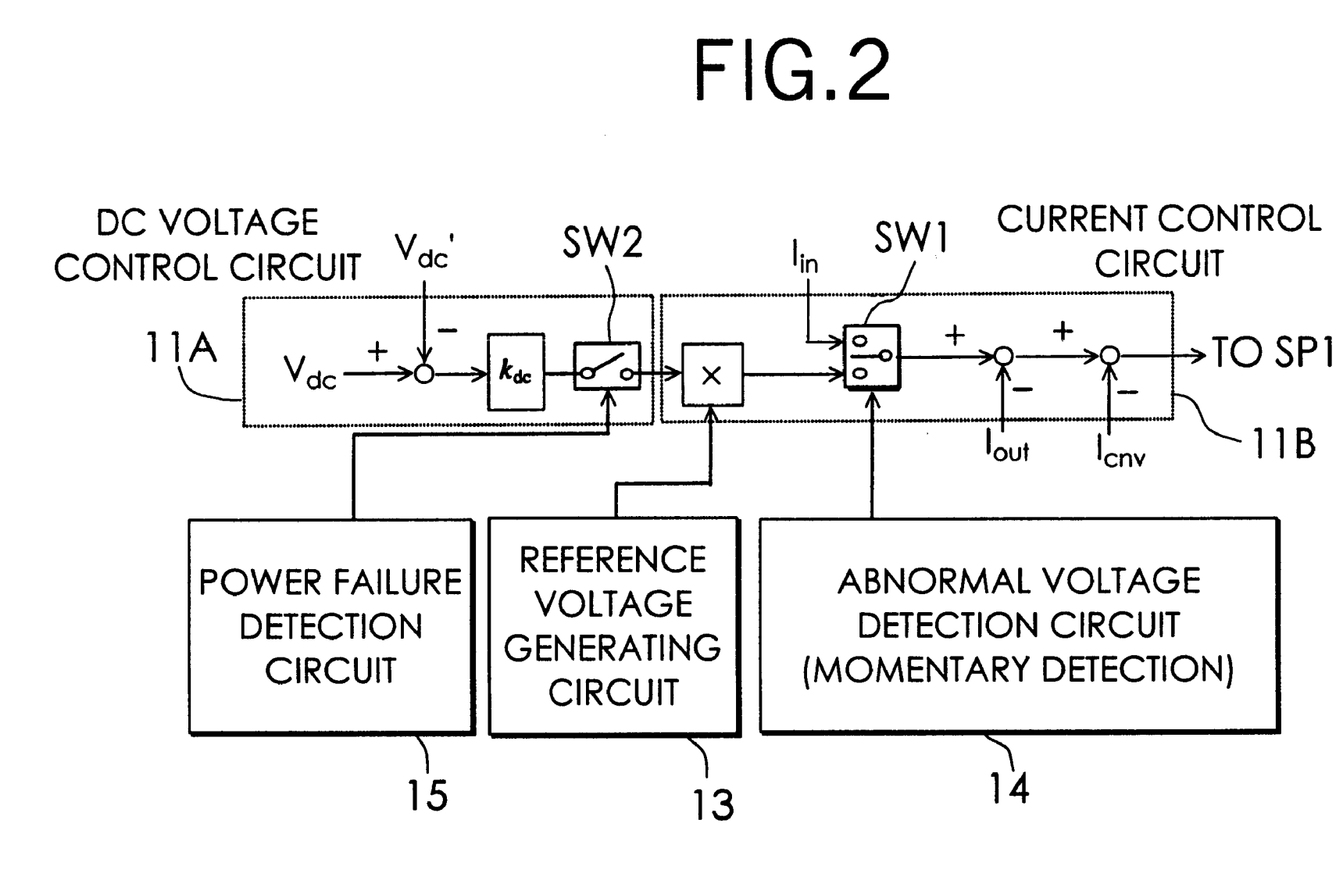
FIG. 2 is a block diagram showing a current control system by way of example.

The current control system 11 is constituted by a DC voltage control circuit 11A and a current control circuit 11B. The current control system 11 may be constructed in such a manner as shown in FIG. 2 by way of example. More particularly, the DC voltage control circuit 11A acts to obtain a differential voltage between a DC command voltage Vdc commanded by a DC voltage command optionally externally fed thereto and a DC-side voltage Vdc' of the power converter 1 detected by the meter transformer T3, to thereby increase the differential voltage by constant times ($k_{dc}$). The current control system shown in FIG. 2 includes a switch circuit SW2 kept turned off during a period of time for which the power failure detection circuit 15 detects a power failure of the commercial power supply AC. In the illustrated embodiment, arrangement of the switch circuit SW2 is not necessarily required. When the switch circuit SW2 is not arranged, it is not required to input an output of the power failure detection circuit 15 to the DC voltage control circuit 11A.

The current control circuit 11B functions to obtain an input current command value Io corresponding to an input current of the power converter 1 on the basis of a multiplied value between an output of the DC voltage control circuit 11A (the above-described differential voltage value increased by the constant times) and an output of the reference voltage generating circuit 13. Also, the current control circuit 11B, when the commercial power supply AC is in a normal or silent condition, functions so that a value (Io-Iout-Icnv) obtained by subtracting both a load current Iout flowing to the load L which is detected by the current transformer CT1 and a current Icnv flowing to the power converter 1 from the AC-side which is detected by a current transformer CT3 from the input current command value Io may be outputted in the form of a current control command. In order to control the power converter 1 of the voltage control type, the PWM circuit 16 is fed with a control command obtained by adding the current control command to a voltage control command outputted from a voltage control circuit 12 described below. When a voltage of the commercial power supply AC is at a normal or silent level, the voltage control signal is determined to be smaller than the current control signal. Thus, the power converter 1 carries out both power rectifying operation and active filter operation.

When the abnormal voltage detection circuit 14 detects that voltage reduction abnormality occurs in a voltage of the commercial power supply AC, to thereby generate a voltage abnormality detection signal therefrom, the switch circuit SW1 is kept changed over during a period of time for which the detection signal is outputted, so that an AC current flowing through the AC switch SW or an input current Iin detected by the current transformer CT2 is substituted for the input current command value Io and acts as a substituted input current command value. Thus, when voltage reduction abnormality occurs in the commercial power supply AC, the value Iin-Iout-Icnv may be outputted as the current control command. This permits the AC current Iin flowing through the AC switch SW to be fed as the input current command value even when the voltage reduction abnormality occurs in the commercial power supply, so that the current control command may be gradually reduced with the voltage reduction. More particularly, the current control command at this time corresponds to a current value fed from the power converter 1 to the load L. This results in an output of the power converter 1 being varied depending on a reduction in AC current Iin with the voltage reduction so as to compensate it. Thus, the illustrated embodiment reduces strain in the voltage occurring when the voltage reduction abnormality occurs in the commercial power supply AC, as compared with the prior art. Then, when the AC current Iin is zero, the thyristors are turned off. Thereafter, the PWM circuit 16 of the power converter 1 is fed with only the voltage control command, so that the power converter 1 starts power inverting operation. At this time, the commercial power supply AC does not yet fall into a power failure condition, so that the capacitor C2 arranged in the power converter 1 acts as a power supply therefor to carry out discharge, to thereby feed AC power to the load. This causes the current Icnv flowing through the power converter 1 to flow in an opposite direction, however, the load current Iout is kept unvaried.

When the commercial power supply AC falls into a power failure condition beyond the voltage reduction, an AC current fed through the AC switch SW to the load L is rendered zero, resulting in the current control command being naturally zero, during which the power converter 1 acts as a power inverter using the capacitor C2 as a power supply therefor. When the power failure detection circuit 15 detects such a power failure of the commercial power supply AC, it feeds a switch circuit SW2 with its output, so that the switch circuit SW2 is turned off. Thus, even when the abnormal voltage detection circuit 14 carries out malfunction or false detection, the current control command is rendered zero.

When the power failure detection circuit 15 detects that the commercial power supply falls into a power failure condition, the DC/DC converter 2 starts conversion operation for discharging the storage battery 3. The DC/DC converter 2 carries out boosting operation so as to feed the power converter 1 with a constant DC voltage based on a DC voltage accumulated in the storage battery 3 during a period of time for which it has a power failure detection signal inputted thereto from the power failure detection circuit 15. The DC/DC converter 2 carries out charging operation of charging the storage battery 3 to a predetermined charging voltage level but does not carry out discharge operation of discharging the storage battery, unless it is fed with the power failure detection signal from the power failure detection circuit 15. This results in the power converter 1 subsequently carrying out inverting operation using the storage battery as a power supply therefor, so that electric supply to the load L may be attained without a power failure. The power failure detection circuit 15 is constructed so as to detect a power failure of the commercial power supply AC before falling of the capacitor C2 into an over-discharge condition and more particularly within a period as short as a lapse of a half cycle.

The voltage control system 12 is fed with a reference sinusoidal voltage signal outputted from the reference voltage generating circuit 13 and an AC voltage detected by the meter transformer T2 for detecting an AC voltage on the AC terminal side of the power converter 1, to thereby output a voltage control command which permits the power converter 1 to carry out power inverting operation of inverting DC power to AC power. The voltage control command outputted from the voltage control system 12 is rendered smaller than the above-described current control command when the commercial power supply AC is in a silent or normal condition, so that the power converter 1 may be kept from carrying out power inverting operation by the voltage control command. In the course of falling of the commercial power supply AC into voltage reduction abnormality, which is detected by the abnormal voltage detection circuit 14, the power converter 1 positively starts the power inverting operation when the voltage control command is larger than the current control command.

The reference voltage generating circuit 13 functions to generate or prepare a reference sinusoidal voltage signal of which a phase coincides with an AC voltage outputted from the commercial power supply AC on the basis of phase information on an AC voltage of the commercial power supply taken in when the commercial power supply AC is in a silent condition. Then, the reference voltage generating circuit 13 outputs the reference sinusoidal voltage signal to the current control system 11 and voltage control system 12.

In the illustrated embodiment, when the power failure detection circuit 15 detects a power failure (including one open phase) of the commercial power supply AC, the power failure detection circuit 15 outputs a power failure detection signal to the current control system 11 and DC/DC converter 2 during a period of time for which it detects the power failure.

In the illustrated embodiment, the control command generation means 10 is constructed so as to add the voltage control command outputted from the voltage control system 12 and the current control command outputted from the current control system 11 to each other at an addition point SP1 and output the thus-added commands to the PWM circuit 16. Such construction of the control command generation means 10 permits the control command generation means 10 to output the voltage control command and current control command to the power converter 1 while carrying out instantaneous changing-over between both control commands, without using any changing-over switch.

Figure 3A:
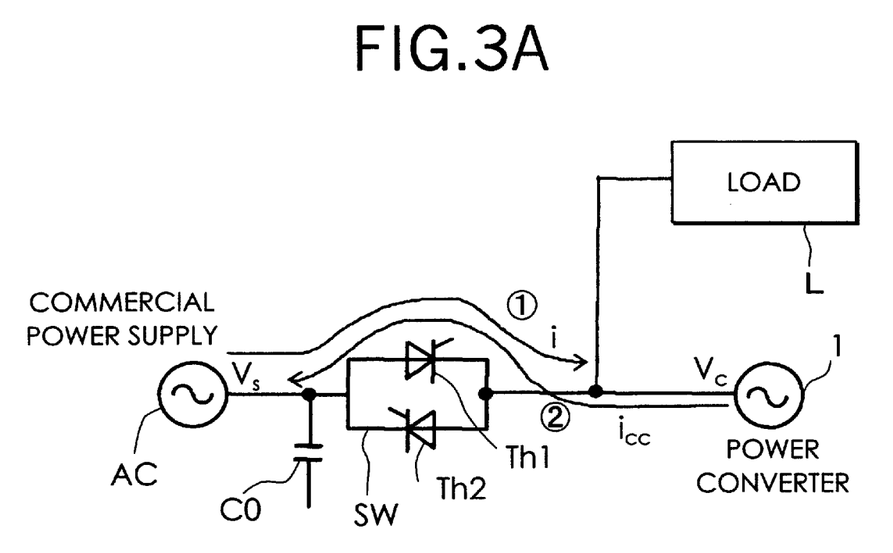
FIG. 3(A) is a circuit diagram showing operation of turning-off an AC switch when a power failure occurs in a commercial power supply.
Figure 3B:
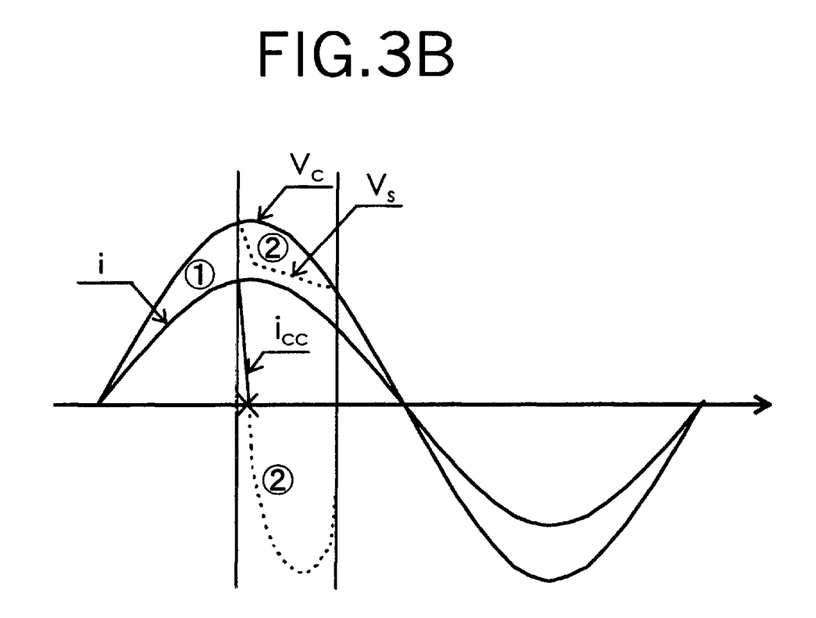
FIG. 3(B) is a waveform diagram showing operation of turning-off an AC switch when a power failure occurs in a commercial power supply.

Now, operation of turning off the AC switch SW when a power failure occurs in the commercial power supply AC will be described with reference to FIGS. 3(A) and 3(B).

First, the power converter 1 may be regarded as a voltage source because of being the voltage control type. Thus, it may be considered that the commercial power supply AC and power converter 1 carry out parallel operation or running through the reactor L (FIG. 1) and the thyristors Th1 and Th2 of the AC switch SW, when they are seen from a side of the load. The power converter 1, when the commercial power supply AC is in a normal or silent condition, acts as an active filter, so that an input current i of a sinusoidal waveform may be fed to the power converter 1 as shown in FIGS. 3(A) and 3(B). Then, when a voltage reduction such as an instantaneous voltage reduction or the like occurs in the commercial power supply AC to cause a voltage difference to be generated between an output voltage Vs of the commercial power supply AC and an output voltage Vc thereof obtained when the power converter 1 is regarded as a voltage source therefor as shown in FIG. 3(B), it intends to flow an AC current $i_{cc}$ from the power converter 1 through the AC switch SW toward the commercial power supply AC. In the illustrated embodiment, the voltage difference which intends to flow the AC current $i_{cc}$ to the power supply is applied in the form of a reverse bias to the thyristors Th1 and Th2, so that the thyristors Th1 and Th2 may be rapidly turned off. In the illustrated embodiment, the AC current $i_{cc}$ does not intend to flow to the commercial power supply AC unless a power failure or an instantaneous voltage reduction occurs in the commercial power supply AC. In other words, the thyristors Th1 and Th2 are subjected to turning-off depending on a reduction in voltage in the AC power supply AC, resulting in malfunction thereof due to noise being effectively prevented.

When an instantaneous or momentary voltage reduction of a half cycle or less such as a partial lack or deficiency of a voltage waveform occurs in the commercial power supply AC, the thyristors Th1 and Th2 are subjected to turning-off, resulting in a DC voltage on the DC terminal side of the power converter 1 being reduced. However, when the voltage waveform is returned to the original state after the next half cycle, the AC switch SW is turned on, so that the commercial power supply may be returned to a normal running state.

Figures 4A, 4B, 4C:
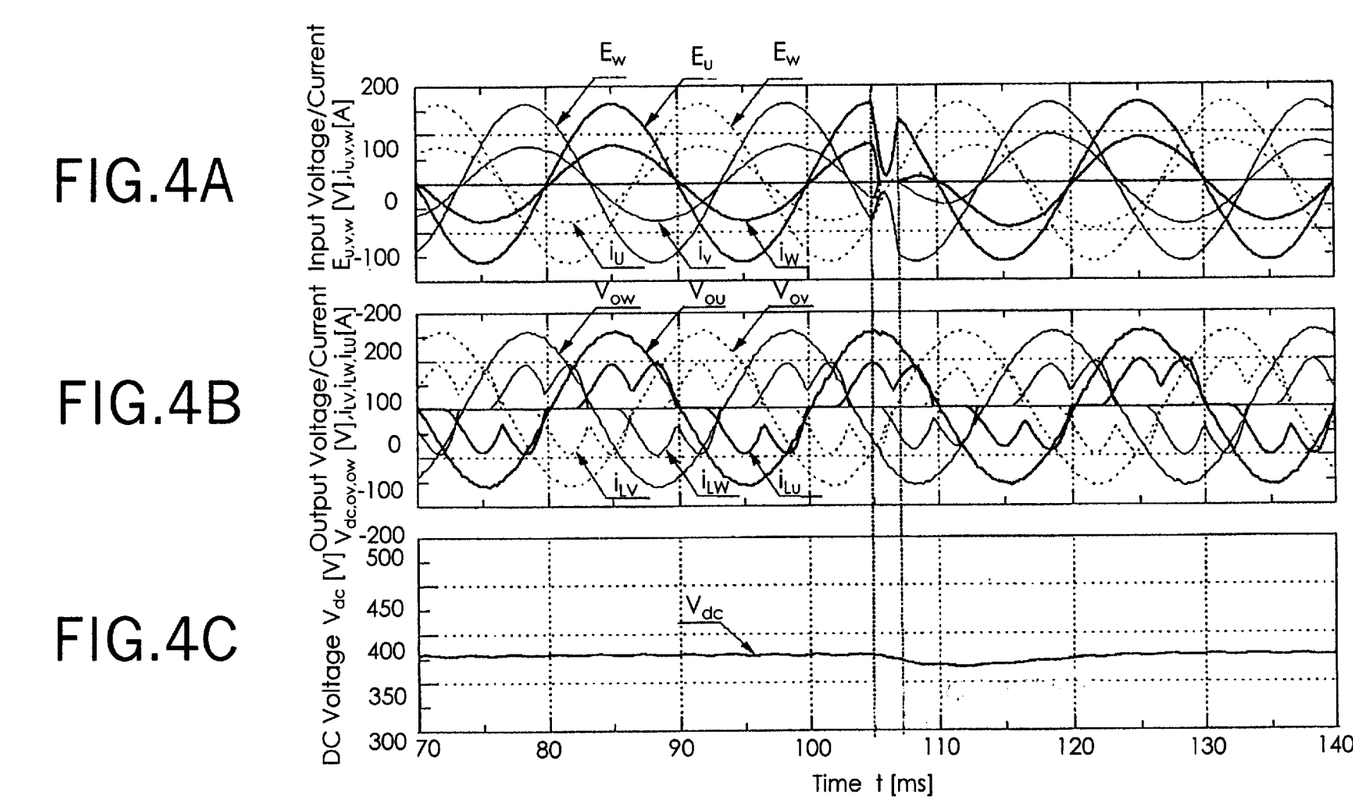
FIG. 4(A) is a graphical representation showing an input voltage and an input current in the uninterruptible power system of FIG. 1 when an instantaneous or momentary voltage reduction of a half cycle or less occurs in a U phase of an input of a commercial power supply AC.
FIG. 4(B) is a graphical representation showing an output voltage and an output current to a load in the uninterruptible power system of FIG. 1 when a momentary voltage reduction of a half cycle or less occurs in a U phase of an input of a commercial power supply AC.
FIG. 4(C) is a graphical representation showing an DC voltage of a power converter in the uninterruptible power system of FIG. 1 when a momentary voltage reduction of a half cycle or less occurs in a U phase of an input of a commercial power supply AC.

The illustrated embodiment will be further described with reference to FIGS. 4(A) to 4(C), wherein FIG. 4(A) is a graphical representation showing an input voltage and an input current in the uninterruptible power system of the illustrated embodiment when an instantaneous voltage reduction of a half cycle or less occurs in a U phase of an input of the commercial power supply AC, FIG. 4(B) shows an output voltage and an output current to the load in the uninterruptible power system when the instantaneous or momentary voltage reduction occurs in the U phase, and FIG. 4(C) shows an AC voltage of the power converter in the uninterruptible power system when the instantaneous voltage reduction occurs in the U phase. FIGS. 4(A) to 4(C) indicate that the illustrated embodiment attains smooth changing-over between active filer operation and so-called inverter operation or changing-over between control by the current control command and that by the voltage control command, even when a voltage reduction occurs for a relatively short period of time, resulting in the changing-over being accomplished without any instantaneous interruption. In the illustrated embodiment, the voltage reduction is a half cycle or less and at a low level, so that feeding of AC power to the load L may be carried out by only discharge of the capacitor C2 without discharge of the storage battery 3 while being free from any power failure.

Figure 5A:
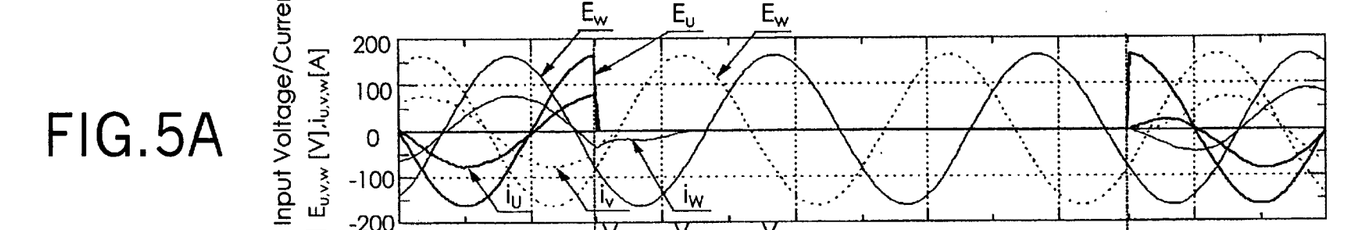
FIG. 5(A) is a graphical representation showing an input voltage and an input current in the uninterruptible power system of FIG. 1 when a short-circuit occurs in a U phase of an input of a commercial power supply AC.
Figure 5B:
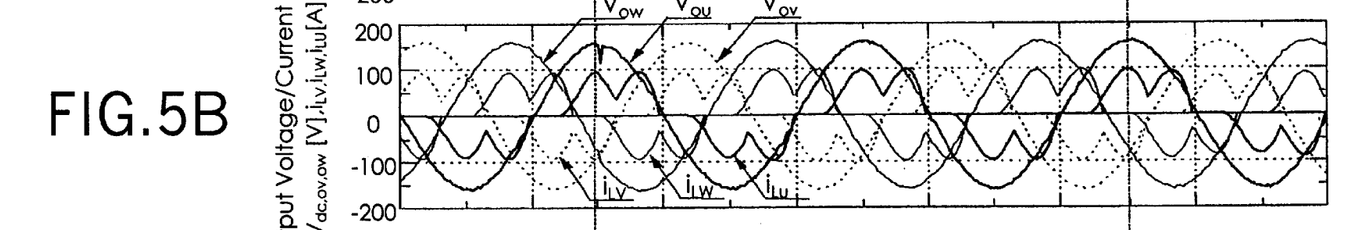
FIG. 5(B) is a graphical representation showing an output voltage and an output current to a load in the uninterruptible power system of FIG. 1 when a short-circuit occurs in a U phase of an input of a commercial power supply AC.
Figure 5C:
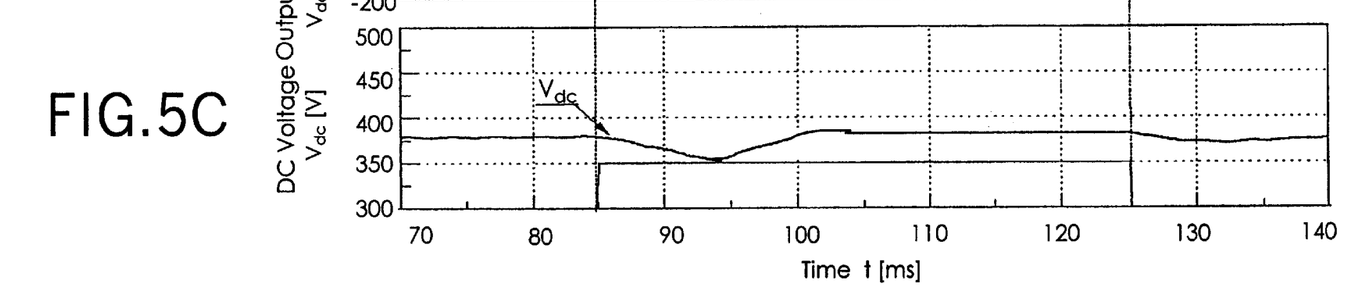
FIG. 5(C) is a graphical representation showing a DC voltage of a power converter in the uninterruptible power system of FIG. 1 when a short-circuit occurs in a U phase of an input of a commercial power supply AC.

Also, the illustrated embodiment will be described with reference to FIGS. 5(A) to 5(C), wherein FIG. 5(A) shows an input voltage and an input current in the uninterruptible power system of the illustrated embodiment when a short-circuit occurs in a U phase of an input of the commercial power supply AC, FIG. 5(B) shows an output voltage and an output current to the load in the uninterruptible power system when a short-circuit occurs in the U phase, and FIG. 5(C) shows a DC voltage Vdc of the power converter 1 when a short-circuit occurs in the U phase. When the short-circuit occurs in the U-phase, an input current of the U phase is abruptly rendered zero, so that the thyristors of the AC switch are turned off. However, changing-over from the current control command to the voltage control command is smoothly carried out in the control command generation means 10. This permits the changing-over to be carried out without any instantaneous or momentary interruption, to thereby prevent the load from being adversely affected, although an output voltage of the U phase is somewhat reduced. The thyristors are not rendered turned off in the remaining phase, so that the current continues to flow during the maximum of a half-wave period. However, a transient state is considered in the current and voltage control systems, to thereby prevent strain from occurring in the output voltage. Likewise, the input current is gradually increased during recovery of the power failure, however, the load is prevented from being adversely affected. The DC voltage is gradually reduced after generation of a power failure in the commercial power supply and then gradually increased. The power failure detection circuit 15 judges the power failure at a changing-over point at which changing-over from the reduction to the increase is carried out, so that the DC/DC converter 2 starts feeding of DC power from the storage battery 3 to the power converter 1. This permits the power converter 1 to act as an inverter using the storage battery 3 as a power supply therefor, to thereby feed the load with AC power at a U phase.

Thus, it will be noted that the uninterruptible power system of the regularly commercial feed type of the illustrated embodiment permits changing-over of the output voltage from a commercial feed mode to a feed mode from the storage battery at the time of power failure of the commercial power supply to be accomplished without any instantaneous or momentary interruption, resulting in accommodating to any load.

Figure 6:
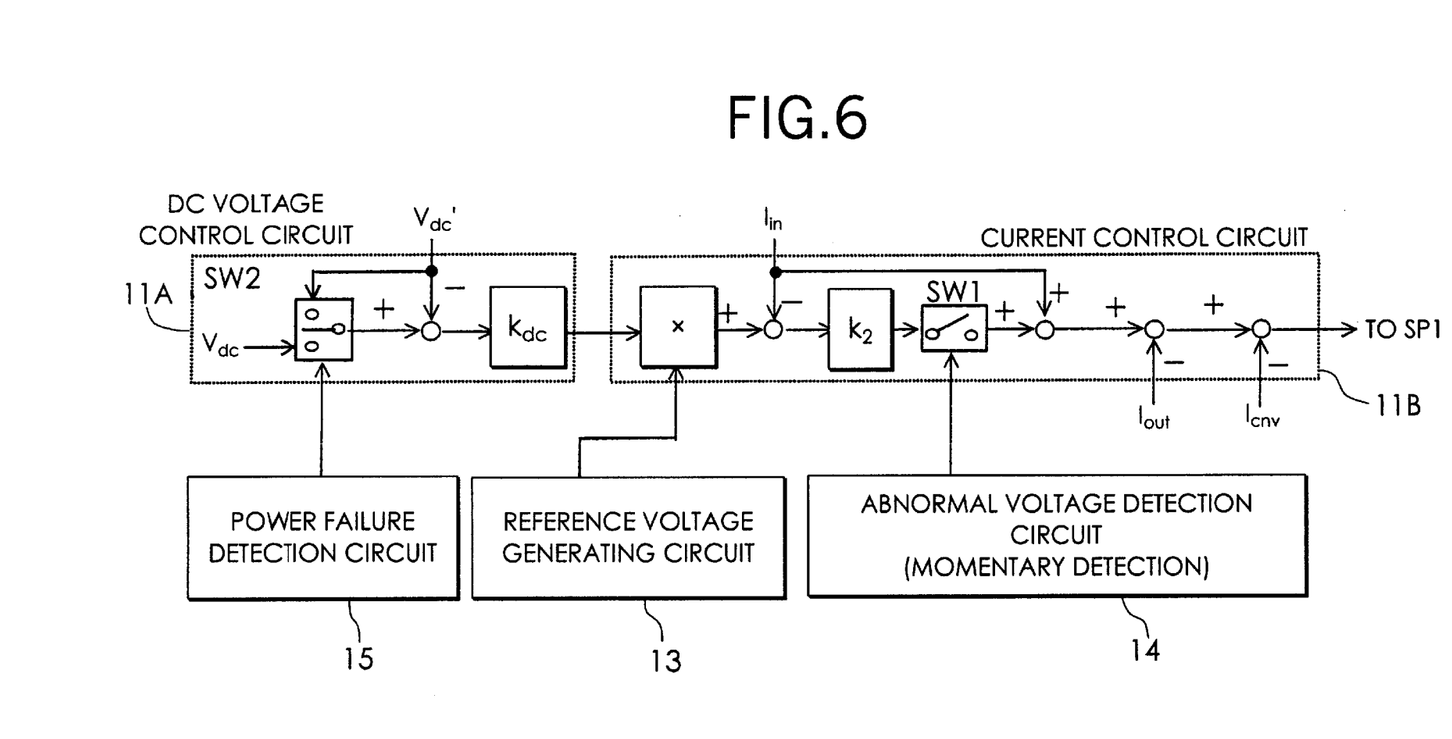
FIG. 6 is a block diagram showing a variation of the current control system shown in FIG. 2.

Referring now to FIG. 6, a modification of the control command generation means 10 is illustrated. In the modification, a current control system 11 includes a current control circuit 11B, which is constructed so as to output an added value as the input current command value when the commercial power supply is in a silent condition. The added value is obtained by adding a value obtained by increasing a difference between an AC current $I_{in}$ flowing through an AC switch SW and a multiplied value Io by constant times (k2) and the AC current $I_{in}$ to each other. In the modification, the switch SW1 is turned off or rendered open when the abnormal voltage detection circuit 14 detects voltage reduction abnormality of the commercial power supply. Thus, when a power voltage falls into a voltage reduction abnormality condition, the AC current $I_{in}$ flowing through the AC switch SW is used as a current command value corresponding to an input current as in the current control system 11 shown in FIG. 2. Such construction permits an output to a load to further approach a sinusoidal wave.

In the illustrated embodiment, the power failure detection circuit 15 is configured so as to detect an average voltage, leading to detection of a power failure of the commercial power supply. Alternatively, it may be constructed in any other suitable manner. For example, the power failure detection circuit may be configured so as to measure a voltage across the capacitor C2 of the power converter 1, to thereby judge that a power failure of the commercial power supply occurs when the voltage measured is below a predetermined level.

Figure 7:
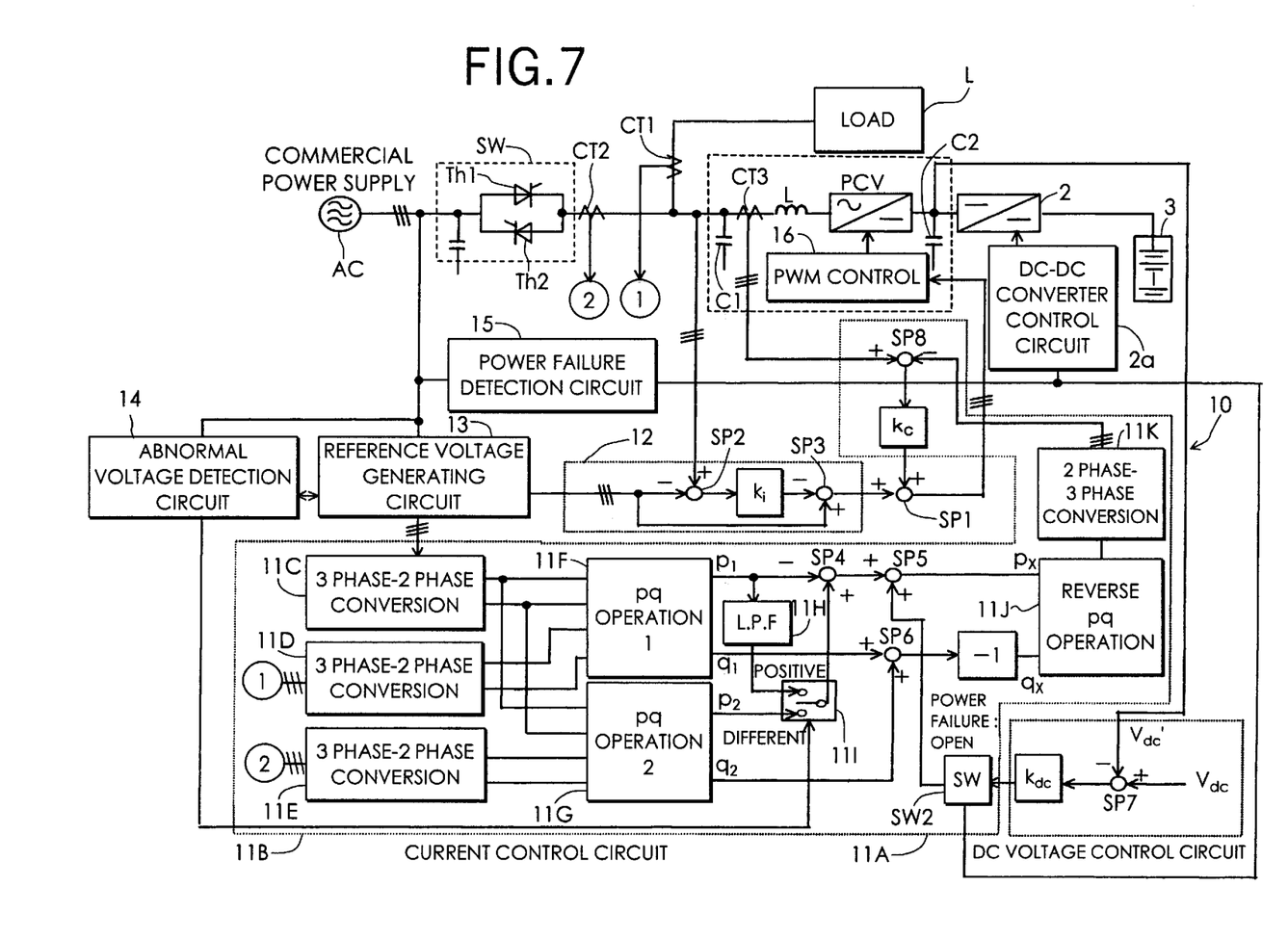
FIG. 7 is a block diagram showing another embodiment of an uninterruptible power system according to the present invention.

Referring now to FIG. 7, another embodiment of an uninterruptible power system according to the present invention is illustrated, wherein operation in a current control system is carried out by PQ operation. In the embodiment shown in FIG. 7, a current control circuit 11B includes first to third 3 phase-2 phase converters 11C to 11E, first and second pq arithmetic units 11F and 11G, a low-pass filter 11H, a switch circuit 11I, an inverse pq arithmetic unit 11J, and a 2 phase-3 phase converter 11K. A DC voltage control circuit 11A is constructed in substantially the same manner as in the embodiment described above with reference to FIG. 2.

In the illustrated embodiment thus constructed, a reference sinusoidal voltage signal outputted from a reference voltage forming circuit 13 is converted into a two-phase signal. Also, a three-phase output of a current transformer CT1 is converted into a two-phase signal by means of the 3 phase-2 phase converter 11E. Then, an output of the 3 phase-2 phase converter 11E is inputted to the first and second pq arithmetic units 11F and 11G. This permits the first pq arithmetic unit 11F to operate momentary effective power (momentary load-side effective power) and momentary false power on a side of a load and the second pq arithmetic unit 11G to operate momentary effective power and momentary false power on a side of a commercial power supply AC. The first pq arithmetic unit 11F and second pq arithmetic unit 11G include output terminals p1 and p2, respectively, through each of which momentary effective power is outputted from each of the arithmetic units 11F and 11G. Momentary load-side effective power outputted from the output terminal p1 of the first pq arithmetic unit 11F is inputted to the low-pass filter 11H, in which a DC component is removed from the power. The momentary load-side effective power is then fed to one connection terminal (or a "positive" terminal in FIG. 7) of the switch circuit 11I in the form of a momentary input-side effective power command value which permits an input current to have a sinusoidal wave. Momentary effective power on a power supply side outputted through the output terminal p2 of the second pq arithmetic unit 11G is fed to the other connection terminal (or a "different" terminal in FIG. 7) of the switch circuit 11I. The switch circuit 11I, when an abnormal voltage detection circuit 14 detects voltage reduction abnormality of the commercial power supply AC to output an abnormal voltage detection signal, changes over a switch contact from a "positive" terminal position to a "different" terminal position.

When a voltage of the commercial power supply AC is normal, the switch contact is kept at the "positive" terminal position. At this time, the low-pass filter 11H removes a DC component from the momentary load-side effective power, so that the momentary load-side effective power from which the DC component is removed is inputted as a momentary input-side effective power command value to a subtraction point SP4, at which the momentary load-side effective power is subtracted from the momentary input-side effective power command value, so that a current control command may be formed or prepared on the basis of the momentary input-side effective power command value thus subtracted.

When voltage reduction abnormality occurs in the commercial power supply AC, the switch contact of the switch circuit 11I is changed over from the "positive" terminal position to the "different" terminal position, so that momentary effective power on a power supply side outputted through an output terminal p2 of the second arithmetic unit 11G or a momentary effective power value obtained by an output of the reference voltage forming circuit 13 and an AC current flowing through the AC switch SW is inputted as an input current command value to the subtraction point SP4 through the switch circuit 11I. Thus, when voltage reduction abnormality occurs in the commercial power supply AC, use of the momentary effective power on the power supply side reduced with the voltage reduction as the momentary input-side effective power permits a reduction in current control command with the voltage reduction, to thereby minimize strain in the output voltage as in the embodiment described above with reference to FIG. 1.

An output at the subtraction point SP4 is inputted to an addition point SP5, to which an output of the switch circuit SW2 as well is inputted. The switch circuit SW2 is fed with a signal obtained by increasing a difference between a DC command voltage Vref obtained at a subtraction point SP7 and a DC-side voltage Vdc' by $k_{dc}$ times. The thus-obtained signal, when a power failure detection circuit 15 detects a power failure of the commercial power supply to turn off the switch circuit SW2, fails to be fed to the subtraction point SP5. This results in malfunction of the device being prevented.

The switch circuit SW2 is kept turned on unless a power failure occurs in the commercial power supply, so that a sum of a difference of the momentary effective power and power $k_{dc} \cdot (Vdc-Vdc')$ required on the DC side added to each other at the addition point SP5 is inputted to an input terminal px of the inverse pq arithmetic unit 11J. This permits charging operation of the storage battery 3. Then, when occurrence of a power failure in the commercial power supply is detected, the switch circuit SW2 is turned off, so that only a difference between the load-side momentary effective power value and the momentary input-side effective power command value may be inputted to the input terminal px of the inverse pq arithmetic unit 11J. This results in charging operation of the storage battery 3 being interrupted.

Also, an added part of momentary false power outputted through an addition point SP6 passes through a transfer element of −1, resulting in being inputted as a value obtained by subtracting the momentary false power from zero (0) to an input terminal qx of the inverse pq arithmetic unit 11J. The inverse pq arithmetic unit 11J has both momentary effective power to be compensated and momentary false power to be compensated inputted thereto, to thereby carry out inverse pq operation, resulting in outputting results of the operation to the 2 phase-3 phase converter 11K. Then, the 2 phase-3 phase converter 11K outputs a command value of a harmonic current to be compensated in a power converter 1. A subtraction point SP8 has the command value of the harmonic current and a value of a current actually flowing to an AC terminal of a power converter 1 inputted thereto. Then, a difference between the command value of the harmonic current and the current value is increased by $k_c$ times and then inputted to the addition point SP1, at which addition between the difference increased by $k_c$ times and a voltage control command is carried out. During a period of time for which the power failure detection circuit 15 detects a power failure of the commercial power supply, a combination or sum of the voltage control command and a current control command generated depending on the voltage control command is outputted from the addition point SP1. During a period of time for which the power failure detection circuit 15 does not detect the power failure, the current control command is predominantly outputted through the addition point SP1 to a PWM control circuit 16 of the power converter 1. At this time, the voltage control command is highly reduced as compared with the current control command.

As can be seen form the foregoing, the uninterruptible power system of the present invention is so constructed that the current control system uses an AC current flowing through the AC switch as the input current command value during a period of time for which the abnormal voltage detection circuit detects voltage reduction abnormality of the commercial power supply. This permits the current control command to be reduced with the voltage reduction when voltage reduction abnormality occurs in the commercial power supply, leading to a reduction in strain in the output voltage at the time of the voltage reduction, as compared with the prior art.

Also, in the present invention, the DC/DC converter functions to feed DC power from the storage battery to the power converter, to thereby minimize the number of times of discharge of the storage battery, resulting in preventing a deterioration in life or durability of the storage battery.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. An uninterruptible power system comprising:

an abnormal voltage detection circuit for detecting voltage reduction abnormality of a commercial power supply;

an AC switch turned on to permit AC power to be fed from said commercial power supply to a load when said commercial power supply is in a normal condition and turned off when said commercial power supply falls into an abnormal condition;

a storage battery;

a power converter of the voltage control type arranged between said AC switch and said storage battery;

said power converter carrying out power rectifying operation of converting AC power of said commercial power supply into DC power to charge said storage battery by said DC power and active filter operation of flowing a current for compensating a harmonic current and/or a reactive current flowing to said load when said commercial power supply is in the normal condition;

said power converter carrying out power inverting operation of inverting DC power into AC power to feed the AC power to said load mainly using said storage battery as a power supply therefor when said commercial power supply is in a condition other than said silent condition;

a control command generation means for outputting a control command to said power converter for feeding AC power to said load without a power failure;

said control command generation means including a voltage control system for outputting a voltage control command which permits said power converter to carry out said power inverting operation and a current control system for outputting a current control command which permits said power converter to carry out said power rectifying operation and active filter operation; and a reference voltage generating circuit for generating a reference sinusoidal voltage synchronized with said commercial power supply;

said current control system being constructed so as to provide an input current command value on the basis of a multiplied value obtained by multiplication between a differential voltage between a DC command voltage commanded by a DC voltage command and a DC-side voltage of said power converter and an output of said reference voltage generating circuit, and to thereby output said current control command on the basis of a value obtained by subtracting a load current value from said input current command value;

said current control system being constructed so as to use an AC current flowing through said AC switch or a value corresponding to said AC current as said input current command value when said abnormal voltage detection circuit carries out detection of said voltage reduction abnormality.

2. An uninterruptible power system comprising:

an abnormal voltage detection circuit for detecting voltage reduction abnormality of a commercial power supply;

an AC switch turned on to permit AC power to be fed from said commercial power supply to a load when said commercial power supply is in a normal condition and turned off when said commercial power supply falls into an abnormal condition;

a storage battery;

a power converter of the voltage control type arranged between said AC switch and said storage battery;

said power converter carrying out power rectifying operation of converting AC power of said commercial power supply into DC power to charge said storage battery by said DC power and active filter operation of flowing a current for compensating a harmonic current and/or a reactive current flowing to said load when said commercial power supply is in the silent condition;

said power converter carrying out power inverting operation of inverting DC power into AC power to feed the AC power to said load mainly using said storage battery as a power supply therefor when said commercial power supply is in a condition other than said silent condition;

a control command generation means for outputting a control command for feeding AC power to said load without a power failure to said power converter;

said control command generation means including a voltage control system for outputting a voltage control command which permits said power converter to carry out said power inverting operation and a current control system for outputting a current control command which permits said power converter to carry out said power rectifying operation and active filter operation; and a reference voltage generating circuit for generating a reference sinusoidal voltage synchronized with said commercial power supply;

said control command generation means being constructed so as to add said current control command and voltage control command to each other to output said current control command and voltage control command thus added to said power converter;

said current control system being configured so as to provide a momentary load-side effective power value corresponding to momentary effective power fed to said load on the basis of an output of said reference voltage forming circuit and a load current value and provide a momentary input-side effective power command value which permits an input current to have a sinusoidal waveform by removing an AC component from said momentary load-side effective power command value, to thereby output said current control command on the basis of a value obtained by subtracting said momentary load-side effective power value from said momentary input-side effective power command value;

said current control system being constructed so as to use a momentary effective power value obtained by an output of said reference voltage generating circuit and a value of an AC current flowing through said AC switch as said momentary input-side effective power command value.

3. An uninterruptible power system as defined in claim 2, further comprising:

a power failure detection circuit for detecting a power failure of said commercial power supply; and a DC/DC converter arranged between said power converter and said storage battery;

said DC/DC converter being configured so as to feed DC power from said storage battery to said power converter during a period of time for which said power failure detection circuit detects a power failure of said commercial power supply.

4. An uninterruptible power system as defined in claim 3, wherein said power converter includes a capacitor connected in parallel to said storage battery through said DC/DC converter; and said power converter feeds said AC current to said load using said capacitor as a power supply therefor during a period of time of from detection of a voltage reduction of said commercial power supply by said abnormal voltage detection circuit to detection of a power failure of said commercial power supply by said power failure detection circuit.

5. An uninterruptible power system as defined in claim 2, wherein said current control system is configured so as to output an added value obtained by addition between a value obtained by increasing a difference between an AC current flowing through said AC switch and said multiplied value by constant times and the AC current flowing through said AC switch as said input current command value, when said commercial power supply is in said normal condition.

6. An uninterruptible power system as defined in claim 4, wherein said power failure detection circuit is configured so as to detect a power failure of said commercial power supply when a voltage across said capacitor is reduced to a level equal to or below a predetermined voltage level.

7. An uninterruptible power. system comprising:

an abnormal voltage detection circuit for detecting voltage reduction abnormality of a commercial power supply;

an AC switch turned on to permit AC power to be fed from said commercial power supply to a load when said commercial power supply is in a normal condition and turned off when said commercial power supply falls into an abnormal condition;

a storage battery;

a power converter of the voltage control type arranged between said AC switch and said storage battery;

said power converter carrying out power rectifying operation of converting AC power of said commercial power supply into DC power to charge said storage battery by said DC power and active filter operation of flowing a current for compensating a harmonic current and/or a reactive current flowing to said load when said commercial power supply is in the normal condition;

said power converter carrying out power inverting operation of inverting DC power into AC power to feed the AC power to said load mainly using said storage battery as a power supply therefor when said commercial power supply is in a condition other than said normal condition;

a control command generation means for outputting a control command for feeding AC power to said load without a power failure to said power converter;

said control command generation means including a voltage control system for outputting a voltage control command which permits said power converter to carry out said power inverting operation and a current control system for outputting a current control command which permits said power converter to carry out said power rectifying operation and active filter operation; and a reference voltage generating circuit for generating a reference sinusoidal voltage synchronized with said commercial power supply;

a power failure detection circuit for detecting a power failure of said commercial power supply; and a DC/DC converter arranged between said power converter and said storage battery;

said DC/DC converter being configured so as to feed DC power from said storage battery to said power converter during a period of time for which said power failure detection circuit detects a power failure of said commercial power supply.

8. An uninterruptible power system as defined in claim 7, wherein said power converter includes a capacitor connected in parallel to said storage battery through said DC/DC converter; and said power converter feeds said AC current to said load using said capacitor as a power supply therefor during a period of time of from detection of a voltage reduction of said commercial power supply by said abnormal voltage detection circuit to detection of a power failure of said commercial power supply by said power failure detection circuit.

* * * * *